(12) United States Patent
Fudemoto et al.

(10) Patent No.: US 10,946,698 B2
(45) Date of Patent: Mar. 16, 2021

(54) TIRE

(71) Applicant: BRIDGESTONE CORPORATION, Tokyo (JP)

(72) Inventors: Hiroyuki Fudemoto, Tokyo (JP); Atsuko Takahashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 187 days.

(21) Appl. No.: 15/762,561

(22) PCT Filed: Sep. 23, 2016

(86) PCT No.: PCT/JP2016/078086
§ 371 (c)(1),
(2) Date: Mar. 23, 2018

(87) PCT Pub. No.: WO2017/051891
PCT Pub. Date: Mar. 30, 2017

(65) Prior Publication Data
US 2018/0272801 A1    Sep. 27, 2018

(30) Foreign Application Priority Data
Sep. 25, 2015  (JP) .............................. JP2015-187887

(51) Int. Cl.
*B60C 1/00*    (2006.01)
*C08L 23/16*   (2006.01)
(Continued)

(52) U.S. Cl.
CPC .............. *B60C 1/0016* (2013.01); *B60C 1/00* (2013.01); *B60C 1/0041* (2013.01); *C08L 23/06* (2013.01);
(Continued)

(58) Field of Classification Search
CPC . C08L 23/12; C08L 25/08; C08L 9/06; C09D 123/12; C09D 125/08;
(Continued)

(56) References Cited

U.S. PATENT DOCUMENTS 4,143,099 A * 3/1979 Duncan ...................... C08J 3/24
524/304
6,407,168 B1    6/2002 Hsu et al.
(Continued)

FOREIGN PATENT DOCUMENTS

CN       104271363 A    1/2015
EP         3050914 A1    8/2006
(Continued)

OTHER PUBLICATIONS

Partial machine translation of JP-2013241132-A (Year: 2019).*
(Continued)

*Primary Examiner* — Kregg T Brooks
(74) *Attorney, Agent, or Firm* — Solaris Intellectual Property Group, PLLC

(57) ABSTRACT

A tire including a circular tire frame containing a resin composition, the resin composition containing a polypropylene having a melting temperature of 160° C. or higher, an ethylene-propylene rubber, and a styrene-containing elastomer, in which a content of the polypropylene having a melting temperature of 160° C. or higher being 60% by mass or less with respect to the resin composition as a whole, and a content of a styrene component being 5% by mass or more with respect to the resin composition as a whole.

11 Claims, 4 Drawing Sheets

(51) Int. Cl.
  *C08L 53/02* (2006.01)
  *C08L 23/06* (2006.01)
  *C08L 23/10* (2006.01)
  *C08F 210/06* (2006.01)

(52) U.S. Cl.
  CPC .............. *C08L 23/10* (2013.01); *C08L 23/16* (2013.01); *C08L 53/02* (2013.01); *C08F 210/06* (2013.01); *C08F 2500/21* (2013.01)

(58) Field of Classification Search
  CPC . C09D 109/06; C08J 2323/12; C08J 2423/12; C08J 2325/08; C08J 2425/08; C08J 2309/06; C08J 2409/06; C09J 125/08; C09J 109/06; C09J 123/12; B60C 1/00–41
  See application file for complete search history.

(56) References Cited

U.S. PATENT DOCUMENTS

| | | |
|---|---|---|
| 2004/0044111 A1 | 3/2004 | Kakarala |
| 2005/0202958 A1 | 9/2005 | Yoshikiyo et al. |
| 2012/0225990 A1 | 9/2012 | Jacob |
| 2015/0025162 A1 | 1/2015 | Sato et al. |
| 2015/0053327 A1 | 2/2015 | Harada et al. |
| 2015/0056398 A1 | 2/2015 | Fudemoto et al. |
| 2016/0208060 A1 | 7/2016 | Nishiguchi et al. |
| 2017/0253709 A1 | 9/2017 | Kurita et al. |

FOREIGN PATENT DOCUMENTS

| | | | | |
|---|---|---|---|---|
| EP | 3192831 | A1 | 7/2017 | |
| JP | H10-1573 | A | 1/1998 | |
| JP | 2002-201332 | A | 7/2002 | |
| JP | 2005-105164 | A | 4/2005 | |
| JP | 2006-124505 | A | 5/2006 | |
| JP | 2006-131915 | A | 5/2006 | |
| JP | 2000-344978 | A | 10/2009 | |
| JP | 2011-74131 | A | 4/2011 | |
| JP | 2012-046031 | A | 3/2012 | |
| JP | 2013241132 | A | * 12/2013 | .............. C08L 23/16 |
| JP | 2015-160886 | A | 9/2015 | |
| WO | 2013/137411 | A1 | 9/2013 | |
| WO | 2013129525 | A1 | 9/2013 | |
| WO | 2013176015 | A1 | 11/2013 | |
| WO | 2015/046476 | A1 | 4/2015 | |
| WO | 2016/039310 | A1 | 3/2016 | |

OTHER PUBLICATIONS

Bridgestone Americas, Inc., Tire Construction, at https://www.bridgestoneamericas.com/en/corporate-social-responsibility/safety/tires-101/tire-construction (retrieved Jun. 5, 2020).*

Extended European Search Report dated Jun. 29, 2018 issued in corresponding EP Patent Application EP16848679.3.

Database WPI 2017, Clarivate Analytics, Week 201363, Thomson Scientific, London, GB; AN 2013-N09954 XP-002782202.

Database WPI 2017, Clarivate Analytics, Week 201380, Thomson Scientific, London, GB; AN 2013-V89320, XP002782203.

International Search Report issued in International Application No. PCT/JP2016/078086 dated Nov. 8, 2016.

Search Report of the Chinese office action dated Oct. 24, 2019, from the SIPO in a Chinese patent application corresponding to the instant patent application.

* cited by examiner

TIRE

TECHNICAL FIELD

The present disclosure relates to a tire.

BACKGROUND ART

In recent years, use of resin materials, instead of rubber and the like, for the frames of tires (which may be referred to as tire frames) of automobiles and the like has been studied from the viewpoints of weight reduction, ease of molding, ease of recycling, and the like. As a resin material for a tire frame, polyamide-based thermoplastic resins are excellent in various properties required for tire frames. Meanwhile, use of polyolefin-based thermoplastic resins as a resin material for a tire frame instead of the polyamide-based thermoplastic resins has also been studied from the viewpoint of raw material cost and the like (for example, see Japanese Patent Application Laid-Open (JP-A) No. 2012-46031).

SUMMARY OF INVENTION

Technical Problem

There is room for further improvement in a tire which includes a tire frame containing a polyolefin-based thermoplastic resin in order to fulfill all of fittability to a rim, water pressure resistance, and low-temperature impact resistance.

Therefore, development of a tire which is excellent in fittability to a rim, pressure resistance, and low-temperature impact resistance has been awaited.

Solution to Problem

A tire including a circular tire frame containing a resin composition, the resin composition containing a polypropylene having a melting temperature of 160° C. or higher, an ethylene-propylene rubber, and a styrene-containing elastomer, a content of the polypropylene having a melting temperature of 160° C. or higher being 60% by mass or less with respect to the resin composition as a whole, and a content of a styrene component being 5% by mass or more with respect to the resin composition as a whole.

Advantageous Effects of Invention

According to the present disclosure, a tire which has excellent fittability to a rim, excellent pressure resistance, and an excellent low-temperature impact property is provided.

DESCRIPTION OF EMBODIMENTS

Figure 1A:
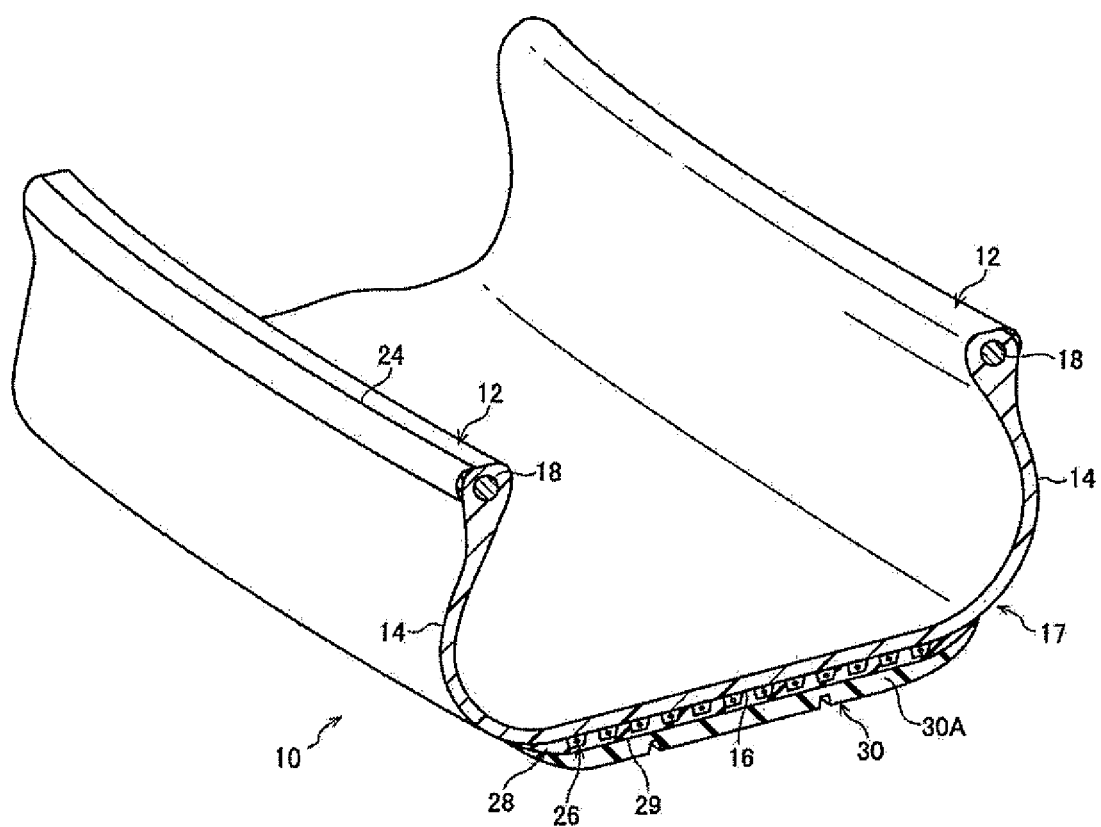
FIG. 1A is a perspective view showing a tire according to an embodiment of the disclosure, which is cut along a tire rotation axis.

Hereinbelow, specific embodiments of the disclosure are described in detail. However, the disclosure is not limited to the following embodiments at all and can be performed with modifications as appropriate.

In the specification, the numerical range expressed by "A to B" includes A and B as the lower and the upper values.

In the specification, the "process" refers not only an independent process but also a step that cannot be clearly distinguished from other processes.

In the specification "resin" or "resin component" is a concept which includes a thermoplastic resin and a thermosetting resin, and does not include a vulcanized rubber.

The tire of the disclosure includes a circular tire frame containing a resin composition, the resin composition containing a polypropylene having a melting temperature of 160° C. or higher, an ethylene-propylene rubber, and a styrene-containing elastomer, in which a content of the polypropylene having a melting temperature of 160° C. or higher is 60% by mass or less with respect to the resin composition as a whole, and a content of a styrene component is 5% by mass or more with respect to the resin composition as a whole.

It is presumed that inclusion of a specific amount of the polypropylene having a melting temperature of 160° C. or higher and the ethylene-propylene rubber in the resin composition included in the tire frame improves the low-temperature impact resistance, and that inclusion of a specific amount of the styrene-containing elastomer in the resin composition optimizes the elastic modulus of the resin composition, leading to further improvement in the low-temperature impact resistance and improvement in the fittability to a rim and the pressure resistance.

The tire frame of the tire of the disclosure may be formed only from the above resin composition, or may be formed from the above resin composition and other materials. The tire may include members other than the tire frame if necessary. The resin composition contained in the tire frame is described hereinbelow.

(Polypropylene Having Melting Temperature of 160° C. or Higher)

Examples of the polypropylene having a melting temperature of 160° C. or higher include: a homopolymer of propylene (homopolypropylene) having a melting temperature of 160° C. or higher; and a copolymer of propylene and 2% by mol or less of other monomers, having a melting temperature of 160° C. or higher. In order to achieve a satisfactory effect of improving the fittability to a rim, pressure resistance, and low-temperature impact resistance sufficiently, it is preferable that the polypropylene having a melting temperature of 160° C. or higher is a homopolymer of propylene. The polypropylene having a melting temperature of 160° C. or higher may be used singly, or a combination of two or more kinds thereof which are different in the composition, weight-average molecular weight, or the like may be used.

Whether a polypropylene has a melting temperature of 160° C. or higher or not may be determined by differential scanning calorimetry (DSC). For example, using a differential scanning calorimeter manufactured by TA Instruments Japan Inc., a sample of a polypropylene is heated at 10° C./min, and the heat of fusion thereof is measured, followed by calculating the melting temperature.

The melting temperature of a polypropylene in a resin composition may be determined in the same manner. More specifically, a differential scanning calorimeter can be used to heat a sample of a resin composition at 10° C./min, measure the heat of fusion corresponding to a polypropylene, and calculate the melting temperature.

The polypropylene having a melting temperature of 160° C. or higher is commercially available. Examples of commercial products include J700GP, Y-400GP, and E105GM manufactured by Prime Polymer Co., Ltd., and EA9 manufactured by Japan Polypropylene Corporation.

From the viewpoint of the fittability to a rim, the content of the polypropylene having a melting temperature of 160° C. or higher in the resin composition is 60% by mass or less, and preferably 57% by mass or less, with respect to the resin composition as a whole. From the viewpoint of the pressure resistance, the content of the polypropylene having a melting temperature of 160° C. or higher in the resin composition is preferably 40% by mass or more, and more preferably 45% by mass or more, with respect to the resin composition as a whole.

The content of the polypropylene having a melting temperature of 160° C. or higher in the resin composition may be determined by dissolving the resin composition in hot xylene, removing a soluble moiety (e.g., an ethylene-propylene rubber and a styrene-containing elastomer) from the resin composition to obtain an insoluble moiety (e.g., the polypropylene having a melting temperature of 160° C. or higher), removing, if necessary, an inorganic substance and the like from the insoluble moiety, and calculating the content of the polypropylene having a melting temperature of 160° C. or higher from the mass of the remainder and the mass of the resin composition as a whole.

When the insoluble moiety contains components (such as a polyethylene) other than the polypropylene having a melting temperature of 160° C. or higher, the proportion of the polypropylene in the insoluble moiety may be calculated by NMR. More specifically, the proportion of the polypropylene in the insoluble moiety may be calculated using o-dichlorobenzene (ODCB)/deuterated benzene $(C_6D_6)=4/1$ as a solvent for $^{13}C$ NMR by integrating a peak corresponding to propylene within the range from 20 to 23 ppm, and integrating a peak corresponding to components other than propylene (for a polyethylene, a peak within the range from 30 to 31 ppm).

(Ethylene-Propylene Rubber)

An ethylene-propylene rubber (EPR) is not especially limited as long as it is a rubber containing at least ethylene and propylene as copolymer components. Specific examples of the ethylene-propylene rubber include an ethylene-propylene rubber (EPM) and an ethylene-propylene-diene rubber (EPDM) which is a copolymer of ethylene, propylene, and a diene monomer. The ethylene-propylene rubber may be used singly, or a combination of two or more kinds thereof which are different in the composition, weight-average molecular weight, or the like may be used.

The ethylene-propylene rubber may be a reactor type rubber in which a polypropylene has been kneaded at the stage of synthesis or a blend type rubber in which a polypropylene has been added afterwards. The ethylene-propylene rubber is also commercially available. Examples of commercial products include 4045M manufactured by Mitsui Chemicals, Inc., and EP331 and T7141 manufactured by JSR Corporation.

From the viewpoint of the low-temperature impact resistance, the content of the ethylene-propylene rubber in the resin composition is preferably 5% by mass or more, and more preferably 10% by mass or more, with respect to the resin composition as a whole. The content of the ethylene-propylene rubber in the resin composition may be, for example, 20% by mass or less, without particular limitation.

The content of the ethylene-propylene rubber in the resin composition may be determined by the following method. A soluble moiety (such as an ethylene-propylene rubber and a styrene-containing elastomer) obtained by dissolving the resin composition in hot xylene is concentrated, reprecipitated in methanol, and then filtered, and an insoluble moiety is dried. Subsequently, using tetrachloroethane as a solvent for $^1H$ NMR, a peak corresponding to the ethylene-propylene rubber within the range from 0 ppm to 1.0 ppm is integrated and a peak corresponding to components other than the ethylene-propylene rubber is integrated, and the proportion of the ethylene-propylene rubber in the soluble part is calculated from the integrated values. From the resultant proportion and the content of the soluble moiety in the resin composition as a whole, the content of the ethylene-propylene rubber in the resin composition can be calculated.

(Styrene-Containing Elastomer)

A styrene-containing elastomer is not particularly limited as long as it is an elastomer containing a styrene component (a constituent unit derived from styrene). Examples of the styrene-containing elastomer include a styrene-butadiene block copolymer (SIS), a styrene-isoprene block copolymer (SBS), a styrene-ethylene-butylene-styrene copolymer (SEBS), and a styrene-ethylene-propylene-styrene copolymer (SEPS). From the viewpoint of the low-temperature impact resistance, the styrene-containing elastomer is preferably at least one selected from the group consisting of SEBS and SEPS. The styrene-containing elastomer may be used singly, or a combination of two or more kinds thereof which are different in the composition, weight-average molecular weight, or the like may be used.

The content of the styrene component in the styrene-containing elastomer is not particularly limited. For example, the content may be selected within the range from 5% by mass to 25% by mass.

The styrene-containing elastomer is also commercially available. Examples of commercial products include Tuftec H1052 (SEBS), Tuftec H1062 (SEBS), and Tuftec H1221 (SEBS) manufactured by Asahi Kasei Corporation, SEPTON 52004 (SEPS) manufactured by KURARAY CO., LTD., and A1535H (SEBS) manufactured by Kraton Corporation.

From the viewpoint of the low-temperature impact resistance, the styrene-containing elastomer is contained in the resin composition preferably in such an amount that the content of the styrene component is 5% by mass or more, and more preferably 5.4% by mass or more, with respect to the resin composition as a whole. From the viewpoint of the pressure resistance, it is preferable that the styrene-containing elastomer is contained in the resin composition in such an amount that the content of the styrene component is 9% by mass or less with respect to the resin composition as a whole.

From the viewpoint of the low-temperature impact resistance, the content of the styrene component in the resin composition is 5% by mass or more, and preferably 5.4% by mass or more, with respect to the resin composition as a whole. From the viewpoint of the pressure resistance, the content of the styrene component in the resin composition is preferably 9% by mass or less with respect to the resin composition as a whole. When the resin composition contains a styrene component other than the styrene-containing elastomer as a resin component, the content of the styrene component in the resin composition is the sum of the content of the styrene component derived from the styrene-containing elastomer and the content of the styrene component derived from the resin component other than the styrene-containing elastomer.

The content of the styrene component in the resin composition may be determined using tetrachloroethane as a solvent for $^1$H NMR by integrating a peak corresponding to styrene within the range from 5.5 ppm to 6.5 ppm, integrating a peak corresponding to components other than styrene, and calculating the content from the resultant values.

(Polyethylene)

The resin composition may contain a polyethylene in addition to the polypropylene having a melting temperature of 160° C. or higher, the ethylene-propylene rubber, and the styrene-containing elastomer. In the specification, examples of the polyethylene include a homopolymer of ethylene, and a copolymer of ethylene and another monomer (such as 1-octene, 1-butene, or 1-hexene). The polyethylene may be used singly, or a combination of two or more kinds thereof which are different in the composition, weight-average molecular weight, or the like may be used.

When the resin composition contains a polyethylene, the content of the polyethylene is not particularly limited. For example, the content may be 5% by mass or less with respect to the resin composition as a whole.

The content of the polyethylene in the resin composition may be determined according to the method described above as a method for determining the content of the polypropylene having a melting temperature of 160° C. or higher.

(Other Components)

The resin composition may contain a component other than the polypropylene having a melting temperature of 160° C. or higher, the ethylene-propylene rubber, the styrene-containing elastomer, and the polyethylene. Examples of such a component include resin components other than the polypropylene having a melting temperature of 160° C. or higher and the polyethylene, such as thermoplastic resins (including thermoplastic elastomers) such as a polyolefin resin, a polyurethane resin, a polyvinylchloride resin, a polyamide resin, or a polyester resin.

The resin composition may contain an additive other than the resin component, such as a filler, an anti-aging agent, an oil, a plasticizer, a colorant, a weathering agent, or a reinforcing agent.

In order to achieve a satisfactory effect of improving the fittability to a rim, pressure resistance, and low-temperature impact resistance, when the resin composition contains resin component(s) other than the polypropylene having a melting temperature of 160° C. or higher, the ethylene-propylene rubber, and the styrene-containing elastomer, the sum of the content(s) of the resin component(s) is preferably 15% by mass or less, more preferably 10% by mass or less, and still more preferably 5% by mass or less, with respect to the resin composition as a whole. Furthermore, when the resin composition contains additive(s) other than the resin component(s), the sum of the content(s) of the additive(s) is preferably 15% by mass or less, more preferably 10% by mass or less, and still more preferably 5% by mass or less, with respect to the resin composition as a whole.

The mass ratio (PP/EPR) between the polypropylene (PP) having a melting temperature of 160° C. or higher and the ethylene-propylene rubber (EPR) in the resin composition is not particularly limited. For example, the mass ratio may be selected within the range from 95/5 to 75/25.

When the resin composition further contains a polyethylene, the mass ratio (PP/(EPR+PE)) of the content of the polypropylene (PP), to the total content of the ethylene-propylene rubber (EPR) and the polyethylene (PE) is not particularly limited. For example, the mass ratio may be selected within the range from 90/10 to 70/30.

The mass ratio ((PP+EPR)/TPS) of the total content of the polypropylene (PP) having a melting temperature of 160° C. or higher and the ethylene-propylene rubber (EPR), to the content of the styrene-containing elastomer (TPS) in the resin composition is not particularly limited. For example, the mass ratio may be selected within the range from 75/25 to 50/50, and preferably within the range from 70/30 to 60/40.

When the resin composition further contains a polyethylene, the mass ratio ((PP+EPR+PE)/TPS) of the total content of the polypropylene (PP) having a melting temperature of 160° C. or higher, the ethylene-propylene rubber (EPR) and the polyethylene (PE), to the content of the styrene-containing elastomer (TPS) in the resin composition is not particularly limited. For example, the mass ratio may be selected within the range from 75/25 to 50/50, and preferably within the range from 70/30 to 60/40.

From the viewpoint of the low-temperature impact resistance, the ethylene-propylene rubber in the resin composition is preferably dispersed in the polypropylene having a melting temperature of 160° C. or higher. Furthermore, the polyethylene may be dispersed together with the ethylene-propylene rubber in the polypropylene having a melting temperature of 160° C. or higher. The state in which the ethylene-propylene rubber is dispersed in the polypropylene having a melting temperature of 160° C. or higher means a state in which the ethylene-propylene rubber is dispersed in the polypropylene having a melting temperature of 160° C. or higher to form a sea-island structure. Whether the ethylene-propylene rubber is in such a state or not can be determined by electron microscope observation and the like.

A dispersion product including the ethylene-propylene rubber dispersed in the polypropylene having a melting temperature of 160° C. or higher may be produced by a known method, or a commercially available product may also be used. Examples of commercial products include J762HP, J709QG and J708UG manufactured by Prime Polymer Co., Ltd.

From the viewpoint of the low-temperature impact resistance, the resin composition preferably has a tensile elastic modulus of 1000 MPa or less, more preferably 800 MPa or less, and still more preferably 700 MPa or less. From the viewpoint of the pressure resistance, the resin composition preferably has a tensile elastic modulus of 200 MPa or more.

The tensile elastic modulus of the resin composition in the specification is a value measured according to JIS K7113: 1995.

The tire of the disclosure may include other members than the tire frame, if necessary. For example, the tire may include a reinforcing member that is positioned at the outer periphery of the tire frame or the like, for the purpose of reinforcing the same. The reinforcing member may be, for example, a metal member such as a steel cord that is coated with a resin material.

When the tire includes a reinforcing member coated with a resin, the type of resin material is not particularly limited. From the viewpoint of elasticity which is required during running of the tire and moldability in the production, the resin material is preferably a thermoplastic elastomer. From the viewpoint of the low-temperature impact resistance, the resin material is more preferably the resin composition described above.

In the following, embodiments of the tire of the disclosure are explained by referring to the drawings.

Figure 1B:
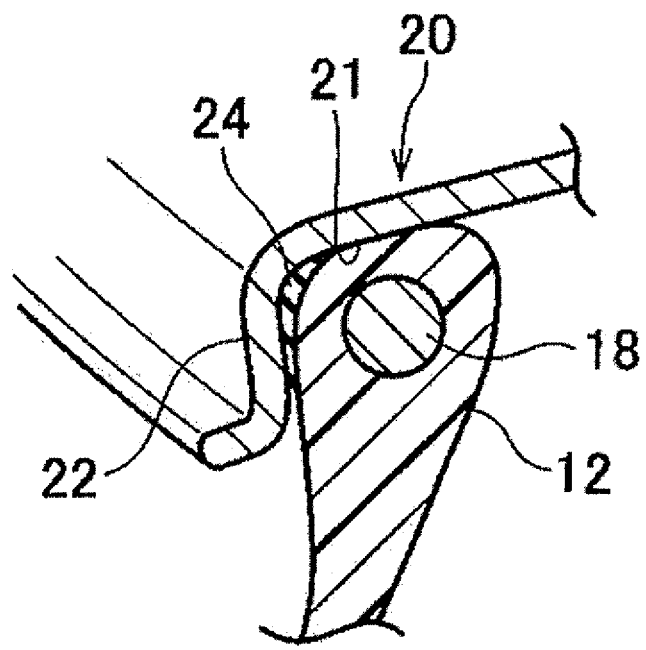
FIG. 1B is a cross-sectional view of a bead portion which serves to attach a tire according to an embodiment of the disclosure to a rim.

FIG. 1A is a perspective view of a section of a portion of tire 10 according to the present embodiment. FIG. 1B is a sectional view of a bead portion of tire 10 according to the present embodiment when it is attached to a rim. As shown in FIG. 1A, tire 10 has a sectional shape similar to that of a conventional pneumatic rubber tire.

As shown in FIG. 1A, tire 10 has tire case 17 that includes a pair of bead portions 12 that are in contact with bead sheet 21 and rim flange 22 of rim 20 shown in FIG. 1B; side portions 14 that extend from bead portions 12 along the tire diameter direction; and crown portion 16 (outer periphery portion) that connects the outer edge in the tire diameter direction of one side portion 14 and the outer edge in the tire diameter direction of the other one of side portion 14.

Tire case 17 corresponds to the tire frame mentioned above, and is formed from the resin composition described above. In the present embodiment, tire case 17 as a whole is formed from the above resin composition. However, the present disclosure is not limited to this configuration, and as with conventional pneumatic rubber tires, the portions of tire case 17 (such as side portion 14, crown portion 16, and bead portion 12) may be formed from different resin materials. Furthermore, in order to reinforce the portions of tire case 17, a reinforcing material (such as a fiber, a cord, a nonwoven fabric, or a woven fabric made of a polymer material, a metal or the like) may be embedded and placed in the portions.

Tire case 17 according to this embodiment is formed by bonding an equatorial plane of a tire case half with an equatorial plane of another tire case half, each having a shape of tire case 17 obtained by cutting the same along the circumferential direction. Tire case 17 is not limited to this embodiment in which tire case 17 has been formed by bonding two members, and it is also possible to form tire case 17 from three or more members.

The tire case halves may be prepared by a method such as vacuum molding, pressure molding, injection molding or melt casting. Therefore, it is not necessary to perform vulcanization and a manufacturing process can be simplified and the time for the production can be shortened, as compared to a conventional case in which a tire case is molded using a rubber.

In this embodiment, bead core 18 having a ring shape is embedded in bead portion 12 shown in FIG. 1B, like a conventional pneumatic tire. Although a steel cord is used as bead core 18 in this embodiment, it is possible to use an organic fiber cord, a resin-coated organic fiber cord, a hard resin cord or the like. It is possible to omit bead core 18 as long as stiffness of bead portion 12 is secured and attachment to rim 20 is favorably performed.

In the present embodiment, on a part of bead portion 12 in contact with rim 20 and a part of bead portion 12 in contact with at least rim flange 22 of rim 20, sealing layer 24 having a ring shape is formed. Sealing layer 24 is made of a material which is superior in sealing property to the resin composition which constitutes tire case 17. Sealing layer 24 may also be formed on a part in which tire case 17 (bead portion 12) contacts bead sheet 21. When the resin composition which constitutes tire case 17 can independently secure the sealing property with the rim 20, sealing layer 24 may be omitted.

Examples of the material which is superior in the sealing property to the resin composition which constitutes tire case 17 include materials softer than the resin composition which constitutes tire case 17, such as a rubber or a thermoplastic resin or thermoplastic elastomer softer than the resin composition.

Examples of the rubber include a rubber of the same kind as that used in the outer surface of a bead portion in a conventional pneumatic rubber tire.

Examples of the thermoplastic resin include resins such as a polyamide-based resin, a polyolefin-based resin, a polystyrene-based resin, or a polyester resin, mixtures of these thermoplastic resins, and mixtures of these thermoplastic resins and a rubber or a thermoplastic elastomer.

Examples of the thermoplastic elastomer include a polyester-based thermoplastic elastomer, a polyamide-based thermoplastic elastomer, a polystyrene-based thermoplastic elastomer, a polyurethane-based thermoplastic elastomer, a polyolefin-based thermoplastic elastomer, mixtures of these thermoplastic elastomers, and mixtures of these thermoplastic elastomers and a thermoplastic resin or a rubber.

As shown in FIG. 1A, reinforcing cord 26 which has rigidity higher than the rigidity of the resin composition which constitutes tire case 17 is wound around crown portion 16 in the circumferential direction of tire case 17. In a cross-sectional view along the axis direction of tire case 17, reinforcing cord 26 is wound around tire case 17 helically with at least a part of reinforcing cord 26 being embedded in crown portion 16 to form reinforcing cord layer 28. On an outer side in the tire diameter direction of reinforcing cord layer 28, tread 30 made of a material which is superior in abrasion resistance to the resin composition which constitutes tire case 17, such as a rubber, is placed.

Figure 2:
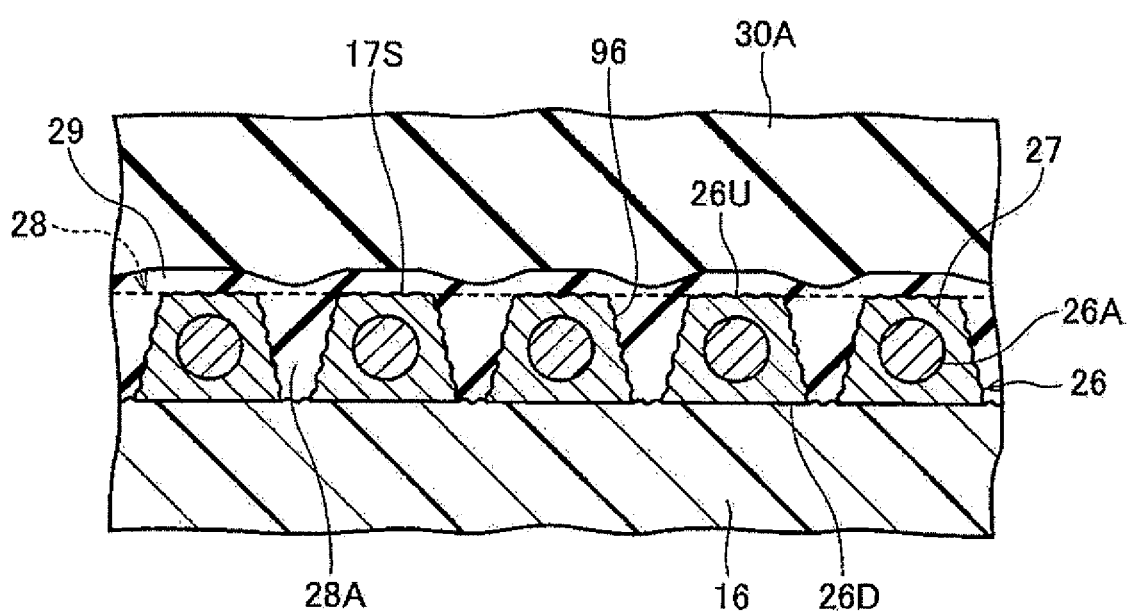
FIG. 2 is a sectional view along a tire width direction showing a circumference of a reinforcing layer of the tire.

In the present embodiment, as shown in FIG. 2, reinforcing cord 26 is a coated-cord member in which metal member 26A such as a steel cord is coated with coating resin material 27.

In the present embodiment, a resin composition which is the same as the resin composition forming tire case 17 is used as coating resin material 27. Alternatively, other thermoplastic resins or thermoplastic elastomers may be used as coating resin material 27. Reinforcing cord 26 is bonded to crown portion 16 by a method such as welding or adhesion with an adhesive. Alternatively, reinforcing cord 26 may be a steel cord or the like which is not coated with coating resin material 27.

It is preferable that the elastic modulus of coating resin material 27 is within 0.1 to 10 times the elastic modulus of the resin composition forming tire case 17. When coating resin material 27 has an elastic modulus 10 times or less the elastic modulus of the resin composition forming tire case 17, the crown portion is not too hard, and the fitting to a rim is easily performed. When coating resin material 27 has an elastic modulus 0.1 times or more the elastic modulus of the resin composition forming tire case 17, the resin which forms reinforcing cord layer 28 is not too soft, and a shear stiffness within a belt plane is excellent and a cornering force is improved.

In this embodiment, as shown in FIG. 2, reinforcing cord 26 has a sectional shape that is approximately trapezoidal. In the following, the upper side of reinforcing cord 26 (the outer side in a tire diameter direction) is indicated as 26U, and the lower sider of reinforcing cord 26 (the inner side in a tire diameter direction) is indicated as 26D. Although reinforcing cord 26 has a sectional shape that is approximately trapezoidal in this embodiment, the disclosure is not limited thereto and reinforcing cord 26 may have any shape except a shape in which the width is broader at the upper side 26U than at the lower side 26D.

As shown in FIG. 2, since reinforcing cords 26 are positioned with intervals in a circumferential direction, there are spaces 28A between the adjacent portions of reinforcing cords 26. Therefore, the outer peripheral surface of reinforcing cord layer 28 has a concave-convex shape, and outer peripheral surface 17S of tire case 17, in which reinforcing cord layer 28 forms the outer peripheral portion, also has a concave-convex shape.

At outer peripheral surface 17S of tire case 17 (including a portion having a concave-convex shape), finely roughened texture 96 is formed and cushion rubber 29 is bonded thereto with a bonding agent. Cushion rubber 29 flows and fills finely roughened texture 96 at a portion in contact with reinforcing cord 26.

On cushion rubber 29 (the outer peripheral side of the tire), tread 30 as described above is bonded. Tread 30 has a tread pattern (not shown in the drawing) including plural grooves at a portion to be in contact with a road surface, like a conventional pneumatic rubber tire.

Next, the method of manufacturing the tire according to the present embodiment is described.

(Tire Case Forming Process)

First, tire case half bodies, which are supported by a thin metal supporting ring, are positioned to face each other. Subsequently, a welding mold is positioned so as to contact the outer peripheral surface of a butted part of the tire case half bodies. The welding mold is configured such that it presses the periphery of the welding portion of the tire case half bodies (the butted part) at a predetermined pressure. Then, the periphery of the welding portion of the tire case half bodies is pressed at a temperature higher than the melting temperature of the resin composition which constitutes the tire case, thereby the welding portion is melted, the tire case half bodies are fused and integrated, and the tire case 17 is formed.

In the present embodiment, the welding portion of the tire case half bodies is heated using the welding mold. However, the disclosure is not limited to this embodiment, and for example, the welding portion may be heated with a high-frequency heating apparatus or the like which is separately provided, or softened or melted in advance with hot air, infrared radiation, or the like, and then pressed with the welding mold to join together the tire case half bodies.

(Reinforcing Cord Winding Process)

Figure 3:
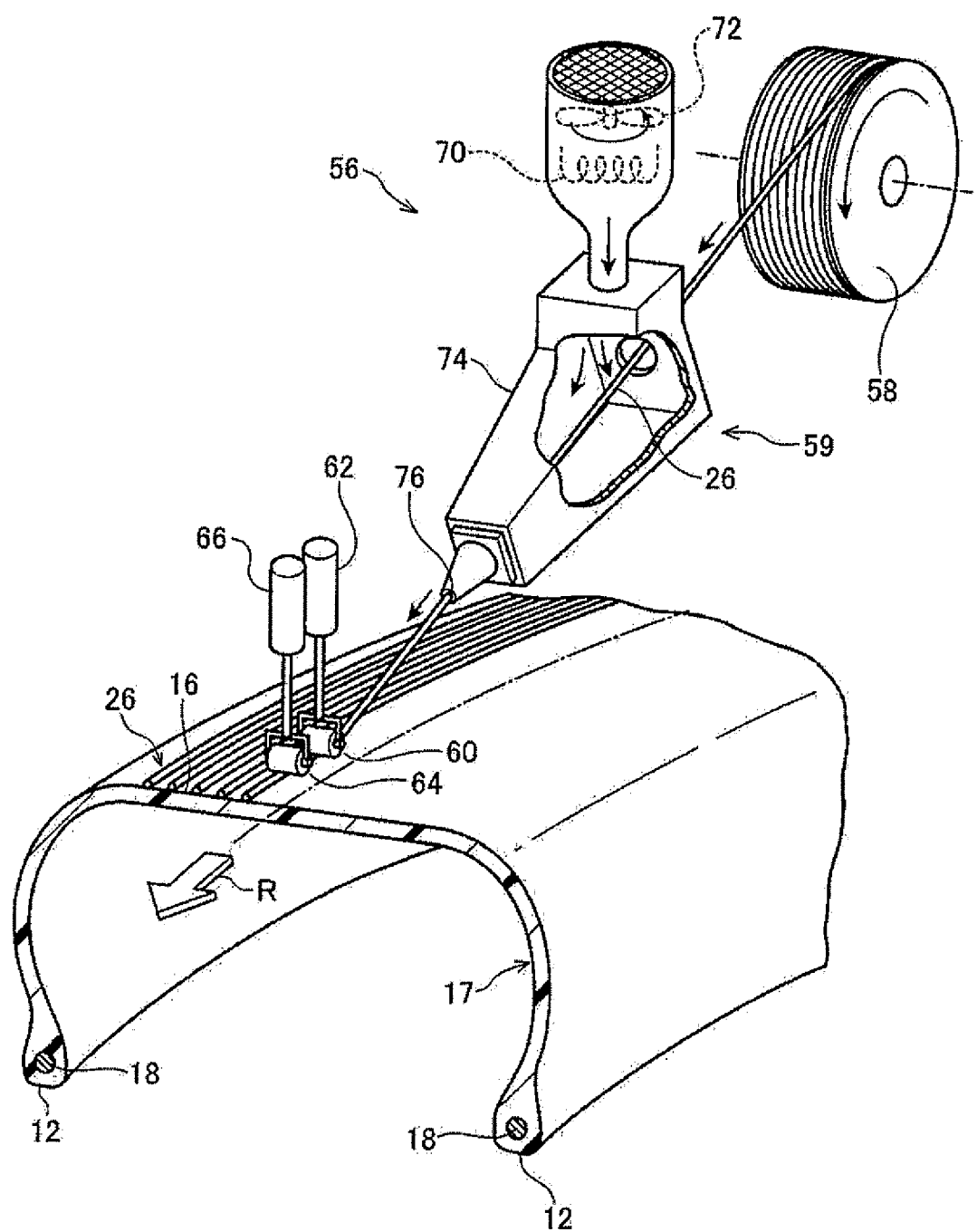
FIG. 3 is a drawing illustrating how a reinforcing cord is embedded in the crown portion using a cord heater and rollers.

Subsequently, a process in which reinforcing cord 26 is wound around tire case 17 is explained by referring to FIG. 3. FIG. 3 is a drawing illustrating the operation of embedding reinforcing cord 26 in a crown portion of tire case 17 with a cord heater and rollers.

In FIG. 3, cord supply apparatus 56 is equipped with reel 58 around which reinforcing cord 26 is wound; cord heater 59 that is positioned downstream of a direction in which reinforcing cord 26 is delivered by reel 58; first roller 60 that is positioned downstream of a direction in which reinforcing cord 26 is delivered; first cylinder 62 that moves first roller 60 in a direction towards or away from the outer peripheral surface of the tire; second roller 64 that is positioned downstream of a direction in which reinforcing cord 26 is delivered by first roller 60; and second cylinder 66 that moves second roller 64 in a direction towards or away from the outer peripheral surface of the tire. Second roller 64 may be used as a cooling roller made of metal.

In this embodiment, the surface of first roller 60 and the surface of second roller 64 are subjected to treatment for avoiding attachment of molten or softened coating resin material 27 (for example, fluororesin-coating treatment). It is also possible to use a roller formed of a material to which coating resin material 27 is not likely to adhere. Cord supply apparatus 56 may have either one of first roller 60 or second roller 64, although it is equipped with both of them in this embodiment.

Cord heater 59 is equipped with heater 70 and fan 72 for generating a hot wind. Further, cord heater 59 is equipped with heating box 74 having a space in which the generated hot wind is supplied and reinforcing cord 26 is passes, and outlet 76 from which reinforcing cord 26 that has been heated is discharged.

In this process, the temperature of heater 70 of cord heater 59 is increased and the air heated by heater 70 is delivered to heating box 74 with a wind created by the rotation of fan 27. Then, reinforcing cord 26 is wound off from reel 58 and delivered to heating box 74, and heated. The temperature for the heating is adjusted so that coating resin material 27 of reinforcing cord 26 is melted or softened.

Reinforcing cord 26 that has been heated passes through outlet 76 and is wound around the outer peripheral surface of crown portion 16 of tire case 17, which is rotated in a direction indicated by R in FIG. 3, in a spiral manner while applying a constant tension. At this time, the lower surface 26D of reinforcing cord 26 contacts the outer peripheral surface of crown portion 16, and coating resin material 27 that is melted or softened by heating is spread on the outer peripheral surface of crown portion 16, whereby reinforcing cord 26 is bonded to the outer peripheral surface of crown portion 16. In this way, adhesion strength between crown portion 16 and reinforcing cord 26 is improved.

Although reinforcing cord 26 is bonded to the outer peripheral surface of crown portion 16 by a process as described above in this embodiment, the bonding may be performed by a different process. For example, the bonding may be performed such that reinforcing cord 26 is partially or totally embedded in crown portion 16.

(Roughening Process)

Subsequently, blasting media are ejected at high speed using a blasting apparatus (not shown) against outer peripheral surface 17S of tire case 17 while rotating tire case 17. The ejected blasting media collide against the outer peripheral surface 17S, and fine roughness 96 is formed at outer peripheral surface 17S with an arithmetic average roughness Ra of 0.05 mm or more. By forming fine roughness 96 at outer peripheral surface 17S of tire case 17, outer peripheral surface 17S becomes hydrophilic to increase wettability with respect to a bonding agent as described later.

(Layering Process)

Subsequently, a bonding agent for bonding cushion rubber 29 is applied on outer peripheral surface 17S of tire case 17 that has been subjected to the roughening process. The type of the bonding agent is not particularly limited, and examples thereof include triazine thiol adhesives, chlorinated rubber adhesives, phenol resin adhesives, isocyanate adhesives, halogenated rubber adhesives and rubber adhesives. The bonding agent is preferably a bonding agent that becomes reactive at a temperature at which cushion rubber 29 is vulcanized (90° C. to 140° C.).

Then, cushion rubber 29 that has not been vulcanized is wound once around outer peripheral surface 17S of tire case 17 that has been applied with a bonding agent. Further, a bonding agent such as a rubber cement composition is applied on cushion rubber 29. Then, tread rubber 30A that has been vulcanized or not yet vulcanized is wound once around cushion rubber 29 that has been applied with a bonding agent, thereby preparing a green tire case.

(Vulcanizing Process)

Subsequently, the green tire case is placed in a vulcanizing can or a mold, and vulcanized. During the process, cushion rubber 29 that has not been vulcanized flows and fills roughness 96 formed at outer peripheral surface 17S of tire case 17. After the completion of vulcanization, cushion rubber 29 that fills the roughness 96 exhibits an anchoring effect to improve the adhesion strength between tire case 17 and cushion 29, i.e., the adhesion strength between tire case 17 and tread 30 is improved via cushion rubber 29.

Then, sealing layer 24 as mentioned above is bonded to bead 12 of tire case 17 with an adhesive or the like, and tire 10 is obtained.

The embodiments of the disclosure have been described above. However, the embodiments are illustrative examples, and various modifications can be made without departing from the spirit of the present invention. It goes without saying that the scope of right of the disclosure is not limited to the embodiments. The details of embodiments applicable to the disclosure can be found in Japanese Patent Application Laid-Open (JP-A) No. 2012-46031.

The tire of the disclosure includes a tire according to the following aspects.

<1> A tire including a circular tire frame containing a resin composition,
the resin composition containing a polypropylene having a melting temperature of 160° C. or higher, an ethylene-propylene rubber, and a styrene-containing elastomer,
a content of the polypropylene having a melting temperature of 160° C. or higher of 60% by mass being less with respect to the resin composition as a whole, and
a content of a styrene component being 5% by mass or more with respect to the resin composition as a whole.

<2> The tire according to <1>, wherein the styrene-containing elastomer is at least one selected from the group consisting of a styrene-ethylene-butylene-styrene copolymer (SEBS) and a styrene-ethylene-propylene-styrene copolymer (SEPS).

<3> The tire according to <1> or <2>, wherein the ethylene-propylene rubber is dispersed in the polypropylene having a melting temperature of 160° C. or higher.

<4> The tire according to any one of <1> to <3>, wherein the resin composition further contains a polyethylene.

<5> The tire according to any one of <1> to <4>, further including a reinforcing member coated with a resin composition,
wherein the resin composition contains a polypropylene having a melting temperature of 160° C. or higher, an ethylene-propylene rubber, and a styrene-containing elastomer,
a content of the polypropylene having a melting temperature of 160° C. or higher is 60% by mass or less with respect to the resin composition as a whole, and
a content of a styrene component is 5% by mass or more with respect to the resin composition as a whole.

Examples

Hereinbelow, the disclosure is described in more detail with reference to the following examples, but the disclosure is not limited to these examples.

[Production of Tire]

Tires of examples having the configurations described in the above embodiment and tires of comparative examples were produced by a known method. The tire size was 165/45 R16.

Materials and compositions (unit: parts by mass) shown in Table 1 were used as the resin composition for forming a tire frame. The details of each of the materials shown in Table 1 are as follows.

"J762HP" is a block copolymer (content of homopolypropylene: 82% by mass) in which an ethylene-propylene rubber and a polyethylene are dispersed in homopolypropylene manufactured by Prime Polymer Co., Ltd.

"J700GP" is a propylene homopolymer manufactured by Prime Polymer Co., Ltd.

"J721GP" is a propylene-ethylene copolymer (random copolymer, percentage of propylene: 97% by mass) manufactured by Prime Polymer Co., Ltd.

"H1062" is a hydrogenated styrene-based thermoplastic elastomer (SEBS, trade name "Tuftec H1062", percentage of styrene: 18% by mass) manufactured by Asahi Kasei Corporation.

"S2004" is a hydrogenated styrene-based thermoplastic elastomer (SEPS, trade name "SEPTON S2004", percentage of styrene: 18% by mass) manufactured by KURARAY CO., LTD.

"H1052" is a hydrogenated styrene-based thermoplastic elastomer (SEBS, trade name "Tuftec H1052", percentage of styrene: 20% by mass) manufactured by Asahi Kasei Corporation.

"H1221" is a hydrogenated styrene-based thermoplastic elastomer (SEBS, trade name "Tuftec H1221", percentage of styrene: 12% by mass) manufactured by Asahi Kasei Corporation.

For the resin compositions used in the examples and comparative examples, the content of the styrene component, the content of the polypropylene (for the random polymer, the content of the random polymer), the melting temperature of the polypropylene (for the random polymer, the melting temperature of the random polymer), and the value of the tensile elastic modulus (MPa) measured according to JIS K7113: 1995 are shown in Table 1.

TABLE 1

| | Example 1 | Example 2 | Example 3 | Comparative Example 1 | Comparative Example 2 | Comparative Example 3 |
|---|---|---|---|---|---|---|
| J762HP (PP + EPR + PE) | 70 | 70 | 60 | 75 | — | 100 |
| J700GP (PP) | — | — | — | — | 100 | — |
| J721GR (PP + PE) | — | — | — | — | — | — |
| H1062 (SEBS) | 30 | — | — | — | — | — |
| S2004 (SEPS) | — | 30 | — | 25 | — | — |
| H1052 (SEBS) | — | — | 40 | — | — | — |
| H1221 (SEBS) | — | — | — | — | — | — |
| Styrene component (% by mass) | 5.4 | 5.8 | 8.7 | 4.8 | 0 | 0 |
| Polypropylene (% by mass) | 57 | 57 | 49 | 62 | 100 | 82 |
| Melting temperature of polypropylene (° C.) | 164 | 164 | 164 | 164 | 166 | 164 |
| Tensile elastic modulus (MPa) | 574 | 603 | 486 | 710 | 1780 | 1200 |

TABLE 1-continued

|  | Comparative Example 4 | Comparative Example 5 | Comparative Example 6 | Comparative Example 7 |
|---|---|---|---|---|
| J762HP (PP + EPR + PE) | — | — | — | 70 |
| J700GP (PP) | — | 60 | — | — |
| J721GR (PP + PE) | 100 | — | 60 | — |
| H1062 (SEBS) | — | 40 | 40 | — |
| S2004 (SEPS) | — | — | — | — |
| H1052 (SEBS) | — | — | — | — |
| H1221 (SEBS) | — | — | — | 30 |
| Styrene component (% by mass) | 0 | 7.2 | 7.2 | 3.6 |
| Polypropylene (% by mass) | 100 | 60 | 60 | 57 |
| Melting temperature of polypropylene (° C.) | 147 | 166 | 150 | 163 |
| Tensile elastic modulus (MPa) | 1400 | 703 | 418 | 298 |

The disclosure of Japanese Patent Application No. 2015-187887 is herein incorporated by reference in its entirety. All the documents, patent applications, and technical standards described in the present description are incorporated herein by reference to the same extent as if each of the documents, patent applications, and technical standards is specifically and individually indicated to be incorporated herein by reference.

The invention claimed is:

1. A tire, comprising:
a resin-based circular tire case comprising a pair of bead portions, side portions that extend from the bead portions along a tire diameter direction, and a crown portion that connects an outer edge in the tire diameter direction of one of the side portions and an outer edge in the tire diameter direction of another one of the side portions, the tire case being formed as a whole from a resin composition,
the resin composition comprising a polypropylene having a melting temperature of 160° C. or higher, an ethylene-propylene rubber, and a styrene-containing elastomer,
a content of the polypropylene having a melting temperature of 160° C. or higher being 60% by mass or less with respect to the resin composition as a whole, and
a content of a styrene component being 5% by mass or more with respect to the resin composition as a whole.

2. The tire according to claim 1, wherein the styrene-containing elastomer comprises at least one selected from the group consisting of a styrene-ethylene-butylene-styrene copolymer (SEBS) and a styrene-ethylene-propylene-styrene copolymer (SEPS).

3. The tire according to claim 1, wherein the ethylene-propylene rubber is dispersed in the polypropylene having a melting temperature of 160° C. or higher.

4. The tire according to claim 1, wherein the resin composition further comprises a polyethylene.

5. The tire according to claim 1, further comprising a reinforcing member coated with a second resin composition, wherein:
the second resin composition comprises a polypropylene having a melting temperature of 160° C. or higher, an ethylene-propylene rubber, and a styrene-containing elastomer,
a content of the polypropylene having a melting temperature of 160° C. or higher is 60% by mass or less with respect to the second resin composition as a whole, and
a content of a styrene component is 5% by mass or more with respect to the second resin composition as a whole.

6. The tire according to claim 1, wherein the content of the polypropylene having a melting temperature of 160° C. or higher is 40% by mass or more with respect to the resin composition as a whole.

7. The tire according to claim 1, wherein the content of the styrene component is 9% by mass or less with respect to the resin composition as a whole.

8. The tire according to claim 1, wherein the polypropylene having a melting temperature of 160° C. or higher is selected from the group consisting of a homopolymer of propylene and a copolymer of propylene and 2 mol% or less of another monomer.

9. The tire according to claim 1, wherein a content of the ethylene-propylene rubber is from 5% by mass to 20% by mass with respect to the resin composition as a whole.

10. The tire according to claim 1, wherein a mass ratio PP/EPR between the polypropylene having a melting temperature of 160° C. or higher (PP) and the ethylene-propylene rubber (EPR) is from 95/5 to 75/25.

11. The tire according to claim 1, wherein a mass ratio (PP+EPR)/TPS of a total content of the polypropylene having a melting temperature of 160° C. or higher (PP) and the ethylene-propylene rubber (EPR), to a content of the styrene-containing elastomer (TPS), is from 75/25 to 50/50.

* * * * *